(12) United States Patent
Ochiai et al.

(10) Patent No.: US 8,947,416 B2
(45) Date of Patent: Feb. 3, 2015

(54) DISPLAY DEVICE

(71) Applicant: Japan Display East Inc., Mobara-shi, Chiba-ken (JP)

(72) Inventors: Takahiro Ochiai, Chiba (JP); Mitsuru Goto, Chiba (JP); Youzou Nakayasu, Mobara (JP); Masaki Nishikawa, Chiba (JP); Motoharu Miyamoto, Hachioji (JP)

(73) Assignee: Japan Display Inc., Tokyo (JP)

( * ) Notice: Subject to any disclaimer, the term of this patent is extended or adjusted under 35 U.S.C. 154(b) by 125 days.

(21) Appl. No.: 13/707,629

(22) Filed: Dec. 7, 2012

(65) Prior Publication Data

US 2013/0147779 A1    Jun. 13, 2013

(30) Foreign Application Priority Data

Dec. 7, 2011  (JP) .................................. 2011-267819

(51) Int. Cl.
*G06F 3/038* (2013.01)
*G09G 5/00* (2006.01)
*H02H 9/00* (2006.01)
*G02F 1/1362* (2006.01)
*G02F 1/1345* (2006.01)

(52) U.S. Cl.
CPC ................ *G09G 5/003* (2013.01); *H02H 9/00* (2013.01); *G02F 1/136204* (2013.01); *G02F 1/1345* (2013.01); *G02F 2001/13629* (2013.01); *G02F 2001/136295* (2013.01)
USPC .......................................... 345/211; 345/212

(58) Field of Classification Search
USPC ......................................................... 345/211
See application file for complete search history.

(56) References Cited

U.S. PATENT DOCUMENTS

2003/0179335 A1* 9/2003 Sato et al. ...................... 349/149
2012/0162179 A1* 6/2012 Tanaka et al. ................. 345/211

FOREIGN PATENT DOCUMENTS

JP          2003-222891          8/2003

* cited by examiner

*Primary Examiner* — Charles V Hicks
(74) *Attorney, Agent, or Firm* — Antonelli, Terry, Stout & Kraus, LLP.

(57) ABSTRACT

There is provided a display device that suppresses an electrostatic discharge failure in a manufacturing stage, and improves a yield. A substrate provided in the display device includes: a display unit in which a plurality of pixel circuits, and a common electrode are formed; N (integer satisfying N≥3) gate signal lines extending in the display unit; a gate driver circuit in which N shift register circuits connected to the respective gate signal lines to supply a gate signal are arranged outside of the display unit side by side; a common voltage main line arranged further outside of the gate driver circuit with respect to the display unit; and M common voltage sub-lines extending in M (1≤M<N−1) spacings among (N−1) spacings between the respective N shift register circuits which are arranged side by side, from the common voltage main lines to the common electrode.

12 Claims, 14 Drawing Sheets

US 8,947,416 B2

DISPLAY DEVICE

CROSS-REFERENCE TO RELATED APPLICATION

The present application claims priority from Japanese application JP 2011-267819 filed on Dec. 7, 2011, the content of which is hereby incorporated by reference into this application.

BACKGROUND OF THE INVENTION

1. Field of the Invention

The present invention relates to a display device having gate signal lines and common voltage lines on a substrate, and more particularly to an improvement in anti-static electricity.

2. Description of the Related Art

The gate signal lines that receive a gate signal and the common voltage lines that supply a common reference voltage to a plurality of pixels are arranged on a display panel of the display device. An example of a configuration of this display device is disclosed in, for example, JP 2003-222891 A.

FIG. 12 is a schematic plan view illustrating a gate driver circuit and a peripheral configuration thereof in a related art. As illustrated in FIG. 12, a wiring layer COM which is connected to a lead line CL1 (common voltage line) of a counter voltage signal line CL and to a capacitive signal line CST1 is so formed as to surround a scanning signal driver circuit GSCL (gate driver circuit) connected to a gate signal line GL. The wiring layer COM has two terminals CP on a side where the scanning signal driver circuit GSCL is arranged. The wiring layer COM extends from one of the terminals CP between the scanning signal driver circuit GSCL and a display unit 115 (liquid crystal display unit) (wiring layer COM2), and reaches the other terminal CP through a side of the scanning signal driver circuit GSCL opposite to the display unit 115 (wiring layer COM1). With this configuration, the scanning signal driver circuit GSCL is protected by the wiring layer COM against static electricity from an external. The scanning signal driver circuit GSCL is supplied with a power supply or a signal from a power and control circuit SCC.

SUMMARY OF THE INVENTION

FIG. 12 illustrates two gate signal lines GL1 and GL2 among a large number of gate signal lines GL extending from the scanning signal driver circuit GSCL to the display unit 115. As illustrated in FIG. 12, the respective gate signal lines GL sterically intersect with the wiring layer COM, and an electrostatic discharge failure (spark) can occur in intersecting portions thereof in a manufacturing stage, resulting in the deterioration of a yield. In particular, both of a common layer (and the common voltage line connected to the common layer), and the gate signal lines are wide in layout area where static electricity is liable to be accumulated. As a result, a possibility that the electrostatic discharge failure occurs becomes high.

In this case, the wiring layer COM2 is arranged on the display unit 115 side of the scanning signal driver circuit GSCL, and the wiring layer COM1 is arranged on the opposite side thereof. Therefore, a frame area outside of the display unit 115 becomes wider.

Also, in the display device, for the purpose of narrowing the frame area outside of the display unit, it is conceivable to mount a gate driver circuit on a driver (panel control signal generation unit) integrated into one chip. In this case, a common bus line which is a common voltage main line, and a gate bus line into which a plurality of gate signal lines are bundled extend from the driver into the frame area outside of the display unit. Further, a plurality of common voltage lines (common voltage sub-lines) are branched from the common bus line, and the plurality of gate signal lines are branched from the gate bus line. The common voltage lines and the gate signal lines extend to the display unit.

FIG. 13 is a schematic plan view illustrating a reference example of a layout of the common bus line and the gate bus line arranged on the substrate. In the reference example illustrated in FIG. 13, the display unit 115 is disposed on a substrate 102, and two common bus lines 112A and 112B extend from a driver 111 arranged on a lower side of the figure along the outside of the display unit 115, upward from the bottom of the figure. Further, a plurality of common voltage lines CL (not shown) extend from the common bus lines 112A and 112B to an interior of the display unit 115. Also, two gate bus lines 116A and 116B extend outward from both sides of the driver 111, respectively, and are bent outside of the common bus lines 112A and 112B. Those two gate bus lines 116A and 116B extend upward from the bottom of the figure further outside of the common bus lines 112A and 112B. A plurality of gate signal lines GL extend from the gate bus lines 116A and 116B to the interior of the display unit 115. For simplification, six gate signal lines GL1 to GL6 are illustrated in FIG. 13. Among those gate signal lines GL1 to GL6, three gate signal lines GL3 to GL1 positioned on an upper side extend more in order from the gate bus line 116B with increasing distance from the driver 111, that is, upward from the bottom of the figure. The number of gate signal lines bundled in the gate bus line 116B is more decreased in order. Likewise, three gate signal lines GL6 to GL4 positioned on a lower side extend more in order from the gate bus line 116A upward from the bottom of the figure. The number of gate signal lines bundled in the gate bus line 116A is more decreased in order. Since a large number of thin film transistors (TFTs) are formed on the substrate 102, the substrate 102 is generally called "TFT substrate".

As illustrated in FIG. 13, the gate signal lines GL sterically intersect with the common bus lines 112, and a parasitic capacitance is formed in intersecting portions thereof. That is, even if the gate driver circuit is mounted on the driver, the intersections of the gate signal lines and the common bus lines are not eliminated. Similarly to the liquid crystal display device disclosed in JP 2003-222891 A, the electrostatic discharge failure (spark) can occur in the manufacturing stage.

FIG. 14 is a schematically plan view illustrating another reference example of a layout of the common bus lines and the gate bus lines arranged on the substrate. As in the reference example illustrated in FIG. 13, the two common bus lines 112A, 112B, and the gate bus lines 116A, 116B extend from both sides of the driver 111, respectively. However, unlike the reference example illustrated in FIG. 13, in the reference example illustrated in FIG. 14, the common bus lines 112 are arranged outside of the gate bus lines 116 with reference to the display unit 115. As in the reference example illustrated in FIG. 13, the plurality of common voltage lines CL extend from the common bus lines 112, and the plurality of gate signal lines GL extend from the gate bus lines 116. For simplification, FIG. 14 illustrates six common voltage lines CL1 to CL6 and the six gate signal lines GL1 to GL6.

When the common bus lines 112 and the gate bus lines 116 are arranged in this way, the gate signal lines GL are prevented from sterically intersecting with the common bus lines 112 unlike the reference example illustrated in FIG. 13.

Instead, the gate signal lines GL sterically intersect with the common voltage lines CL. In this case, since an area of the intersecting portions is reduced more than that in the reference example illustrated in FIG. 13, a total amount of the generated parasitic capacitance is reduced. However, as described below, there arises a new problem that the parasitic capacitance is different depending on the gate signal lines GL.

As illustrated in FIG. 14, among three gate signal lines GL1 to GL3 located on the upper side, the gate signal line GL1 sterically intersect with two common voltage lines CL2 and CL3, the gate signal line GL2 sterically intersect with one common voltage line CL3, and the gate signal line GL3 sterically intersects with no common voltage line CL. The same is applied to three gate signal lines GL4 to GL6 located on the lower side. In this case, with an increase in the number of sterically intersecting common voltage lines CL, the intersecting area is increased, and the parasitic capacitance generated in the gate signal lines is increased. Rounding of a gate signal expressed by a time constant CR (in this example, C is a parasitic capacitance generated in each gate signal line, and R is a resistance of each gate signal line) is different depending on the gate signal lines. Therefore, a design necessary to adjust the rounding of the gate signal becomes complicated.

The present invention has been made in view of the above problems, and therefore an object of the present invention is to provide a display device that suppresses electrostatic discharge failure in a manufacturing stage, and improves an yield, with a structure in which portions where common voltage lines and gate signal lines sterically intersect with each other are suppressed.

(1) In order to solve the above problem, according to the present invention, there is provided a display device having a substrate, the substrate including: a display unit in which a plurality of pixel circuits, and a common electrode for applying a common reference voltage to the plurality of pixel circuits are formed; N (integer satisfying N≥3) gate signal lines that extend in the display unit; a gate driver circuit in which N shift register circuits that are connected to the respective gate signal lines to supply a gate signal are arranged outside of the display unit side by side; a common voltage main line that is arranged further outside of the gate driver circuit with respect to the display unit; and M common voltage sub-lines that extend in M (1≤M<N−1) spacings among (N−1) spacings between the respective N shift register circuits which are arranged side by side, from the common voltage main lines to the common electrode.

(2) In the display device according to the above item (1), the common voltage main line includes a superposition structure in which a plurality of conductive layers are stacked on each other through insulating layers.

(3) In the display device according to the above item (2), the substrate further includes a plurality of video signal lines that extend to the display unit, and the plurality of conductive layers include the conductive layers made of the same material as that of the plurality of video signal lines.

(4) In the display device according to the above item (2) or (3), each of the pixel circuits includes a thin film transistor, and the plurality of conductive layers include the conductive layers made of the same material as that of a gate electrode of the thin film transistor.

(5) In the display device according to any one of the above items (2) to (4), an uppermost layer of the plurality of conductive layers is a conductive layer made of the same material as that of the common electrode.

(6) In the display device according to the above item (5), the material of the common electrode is indium tin oxide.

According to the present invention, there is provided the display device that suppresses the electrostatic discharge failure in the manufacturing stage, and improves the yield, with a structure in which portions where the common voltage lines and the gate signal lines sterically intersect with each other are suppressed.

DETAILED DESCRIPTION OF THE INVENTION

Figure 1:
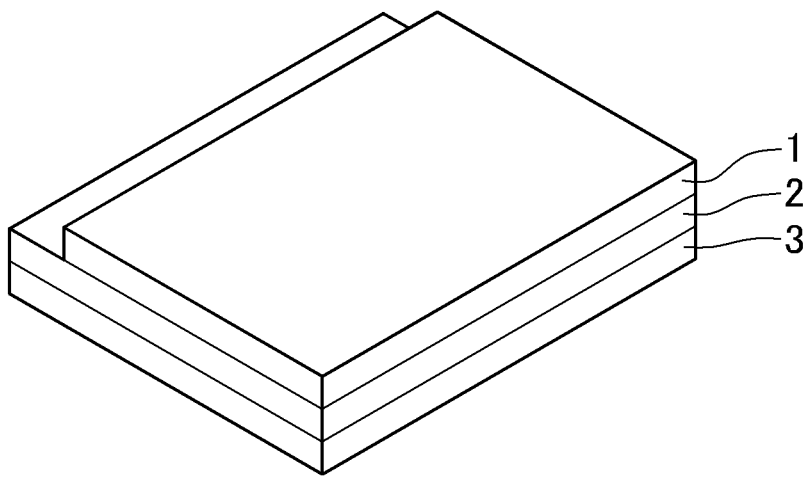
FIG. 1 is an overall perspective view illustrating a liquid crystal display device according to an embodiment of the present invention.

A display device according to an embodiment of the present invention will be described in detail below. The drawings described below are to consistently illustrate this embodiment, and sizes of the drawings do not always match scale sizes described in this embodiment. Also, identical constituent elements are denoted by the same reference numerals or symbols, and their description will not be repeated.

The display device according to this embodiment of the present invention is, for example, an IPS (in-plane switching) liquid crystal display device. FIG. 1 is an overall perspective view illustrating the liquid crystal display device according to this embodiment. The liquid crystal display device includes a TFT substrate 2, a filter substrate 1 that faces the TFT substrate 2 and has a color filter thereon, a liquid crystal material that is sealed in an area interposed between both of those substrates, and a backlight 3 that is positioned in contact with a side of the TFT substrate 2 opposite to the filter substrate 1 side.

Figure 2:
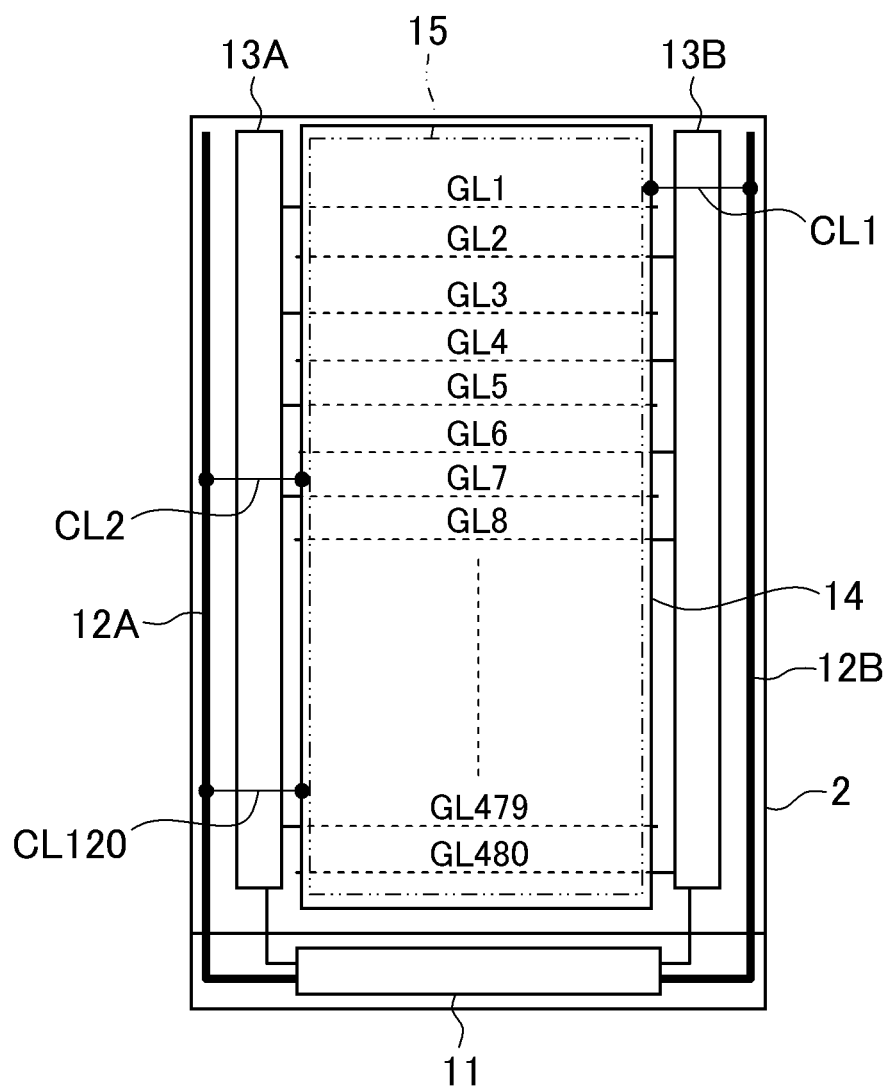
FIG. 2 is a schematic plan view illustrating a configuration of a TFT substrate according to the embodiment of the present invention.

FIG. 2 is a schematic plan view illustrating a configuration of the TFT substrate 2 according to this embodiment. A driver 11 is disposed outside of the TFT substrate 2, and the driver 11 outputs a plurality of control signals to the TFT substrate 2. Two common bus lines 12A, 12B (common voltage main lines), two gate driver circuits 13A, 13B, and a display unit 15 on which a common electrode 14 is formed, are disposed on the TFT substrate 2.

A plurality of pixel circuits (not shown) are formed on the display unit 15, and the common electrode 14 is formed in all of or a part of the display unit 15. A voltage which is a common reference voltage for the plurality of pixel circuits is applied to the common electrode.

The gate driver circuits 13A and 13B are formed on both of right and left sides of the display unit 15, that is, outside of the display unit 15. A plurality of gate signal lines GL extend from the gate driver circuits 13A and 13B into the display unit 15 with equal spacing from each other laterally in the drawing. A plurality of shift register circuits SR (not shown) to be described later are disposed in the gate driver circuits 13A and 13B in correspondence with the plurality of gate signal lines GL. The respective shift register circuits SR are connected to the corresponding gate signal lines GL, and a gate signal is supplied to each of the gate signal lines GL. In this example, 480 gate signal lines GL are present, and 240 shift register circuits SR are disposed in each of the two gate driver circuits 13A and 13B. The gate signal is output to each of the odd gate signal lines GL (240 lines) from the 240 shift register circuits SR disposed in the gate driver circuit 13A, and the gate signal is output to each of even gate signal lines GL (240 lines) from the 240 shift register circuits SR disposed in the gate driver circuit 13B. Hereinafter, an n-th gate signal line is called "$GL_n$", an n-th shift register circuit connected to the n-th gate signal line $GL_n$ is $SR_n$, and an n-th gate signal output, to the n-th gate signal line $GL_n$ by the n-th shift-register circuit $SR_n$ is $G_n$. The gate driver circuits 13 in the liquid crystal display device according to this embodiment enable bidirectional driving. The plurality of gate signals Gn become sequentially higher voltage in order from smaller n values toward larger n values in the forward driving, and become higher voltage in a reverse order in the backward driving.

The two common bus lines 12A and 12B are formed further outside of the two gate driver circuits 13A and 13B with respect to the display unit 15. The gate driver circuits 13 are arranged between the common bus lines 12 and the common electrode 14, respectively, a plurality of common voltage lines CL (common voltage sub lines) that connect the common bus lines 12 and the common electrode 14 are arranged to penetrate through the gate driver circuits 13. In this example, 30 common voltage lines CL extend to the common electrode 14 from each of the two common bus lines 12A and 12B, and 60 common voltage lines CL in total are arranged.

Odd common voltage lines CL extend from the common bus line 12B to the display unit 15, and even common voltage lines CL extend from the common bus line 12A to the display unit 15. In this example, when it is assumed that a k-th common voltage line is a common voltage line $CL_k$, the k-th common voltage line $CL_k$ extends in spacing between (6(k−1)−1)-th and (6(k−1)+1)-th shift register circuits SR in the drawing. A first common voltage line CL1 extends in a spacing between a first shift register circuit SR1 and a dummy shift register circuit SRD which will be described later.

The feature of the present invention resides in that each of the common bus lines 12 is arranged further outside of each gate driver circuit 13 with respect to the display unit 15 so that the common bus lines 12 and the gate signal lines GL are prevented from sterically intersecting with each other. Further, the common voltage lines CL extending from the common bus lines 12 to the common electrode 14 are also prevented from sterically intersecting with the gate signal lines GL. With this configuration, parasitic capacitances generated when the common bus lines 12 and the common voltage lines CL sterically intersect with the gate signal lines GL are suppressed.

Further, the number of common voltage lines CL is smaller than the number of gate signal lines GL. When the common bus line 12A and the gate driver circuit 13A are exemplified, M common voltage lines CL extending from the common bus line 12A to the common electrode 14 are arranged in respective M ($1 \leq M = 60 < N-1$) spacings which are parts of (N−1) spacings existing in N ($N = 240 \geq 3$) shift register circuits SR which are arranged side by side. That is, the common voltage lines CL are not arranged in other (N−M−1) spacings.

In general, wiring patterns of the common bus lines and the common voltage lines are formed in a wide region (area) with respect to a surface of the TFT substrate. Likewise, a wiring pattern of the gate signal lines is formed in a wide region (area). Therefore, in a process of manufacturing the TFT substrate, for example, when the substrate surface is cleaned with pure water, static electricity is accumulated in those wiring patterns due to a friction between the pure water and the substrate. The amount of accumulated static electricity is different depending on positions on the surface of the TFT substrate, and therefore potential differences occur between those wiring patterns, and electrostatic discharge failure occurs in intersecting portions of the wiring patterns. On the contrary, in the display device according to the present invention, the electrostatic discharge failure is suppressed so that the yield can be improved. Not only in the manufacturing process of the TFT substrate, but also when the display device is driven after manufacturing, that is, under practical use conditions, the electrostatic discharge failure may occur in the intersecting portions of the wiring patterns. On the other hand, in the display device according to the present invention, the electrostatic discharge failure is suppressed, and the deterioration of the device with time is suppressed to realize a longer lifetime thereof.

Also, when each of the common voltage lines CL is arranged in the spacing between the adjacent shift register circuits SR, that is, when the common voltage lines CL are arranged to penetrate through each gate driver circuit 13, the shift register circuits SR cannot be arranged in an area occupied by the common voltage lines CL. For that reason, an area of the gate driver circuits 13 is increased. On the contrary, in the display device according to the present invention, the number of common voltage lines CL that penetrate through each of the gate driver circuits 13 is reduced more than the number of gate signal lines GL. As a result, the area of the gate driver circuits 13 can be reduced as compared with a case in which the common voltage lines CL are arranged in all of the spacings of the adjacent shift register circuits SR, and a width of a frame area outside of the display unit 15 can be reduced.

Although not shown for simplification, a large number of video signal lines extend from the driver 11 into the display unit 15 with equal spacing from each other in a longitudinal direction in the drawing. A plurality of pixel areas arranged in a grid configuration are zoned by the gate signal lines GL and the video signal lines, and a pixel circuit is formed in each of the pixel areas. A TFT is formed in a corner of each pixel circuit, and the TFT is connected to each video signal line and each pixel electrode. Also, a gate of the TFT is connected to each gate signal line GL. Also, the pixel electrode of each pixel circuit faces the common electrode 14. The driver 11 disposed outside of the TFT substrate 2 is connected with the common bus lines 12, the gate driver circuits 13, and the video signal lines, and the driver 11 supplies control signals or voltage to those elements.

Figure 3:
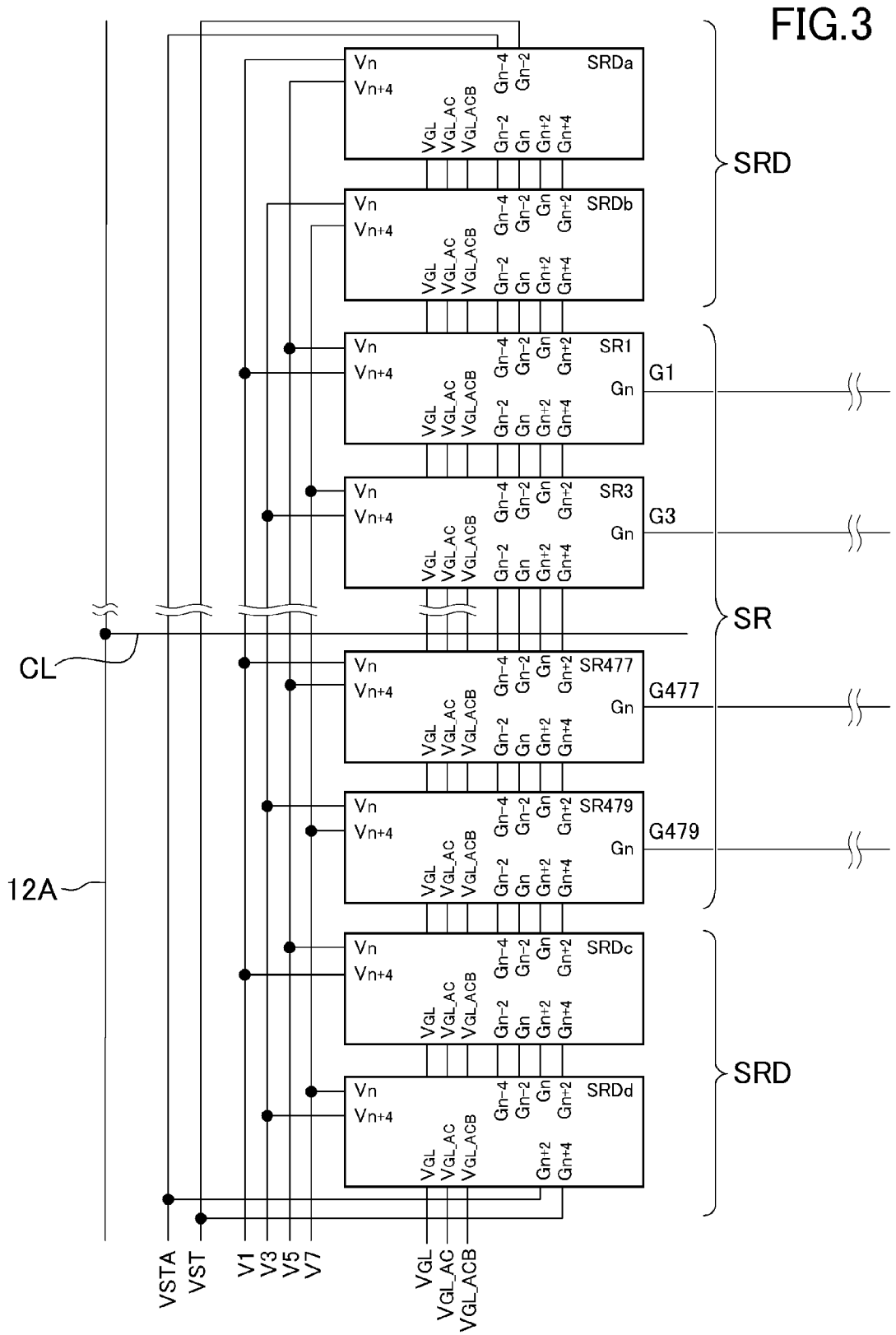
FIG. 3 is a block diagram illustrating a gate driver circuit according to the embodiment of the present invention.

FIG. 3 is a block diagram illustrating the gate driver circuit 13 according to this embodiment. In the figure, the gate driver circuit 13A arranged on a left side of FIG. 2 is illustrated. In FIG. 3, odd-numbered N (N=240) shift register circuits SR connected to the respective odd-numbered N gate signal lines GL are arranged side by side in order downward from above in the figure. Two dummy shift register circuits SRDa and SRDb are further arranged on an upper side of the first shift register circuit SR1 in the figure, and two dummy shift register circuits SRDc and SRDd are further arranged on a lower side of a 479th shift register circuits SR479 in the figure.

Two corresponding clock signal lines out of four clock signal lines that receive respective clock signals of $V_1$, $V_3$, $V_5$, and $V_7$ of four phases are connected to each of the plurality of shift register circuits SR, and to the four dummy shift register circuits SRD. Further, a low voltage line $V_{GL}$, a first variable voltage line $V_{GL\_AC}$ and a second variable voltage line $V_{GL\_ACB}$ are further connected to each of the plurality of shift register circuits SR and to the four dummy shift register circuits SRD. Also, two auxiliary-signals VST and VSTA are input to the respective dummy shift register circuits SRDa and SRDd arranged on both ends of the gate driver circuit 13A.

Four internal wirings are arranged in the respective spacings of the adjacent shift register circuits SR (and the dummy shift register circuits SRD), and one circuit outputs control signals to the other circuit by the internal wirings. The common bus line 12A extends vertically on the left side of the gate driver circuit 13A in the figure, and the common voltage lines CL extend in the respective spacings of the adjacent shift register circuits SR from the common bus line 12A to the display unit 15. As will be described later, the common voltage lines CL sterically intersect with the four internal wirings while extending in the spacings of the adjacent shift register circuits SR.

Figure 4:
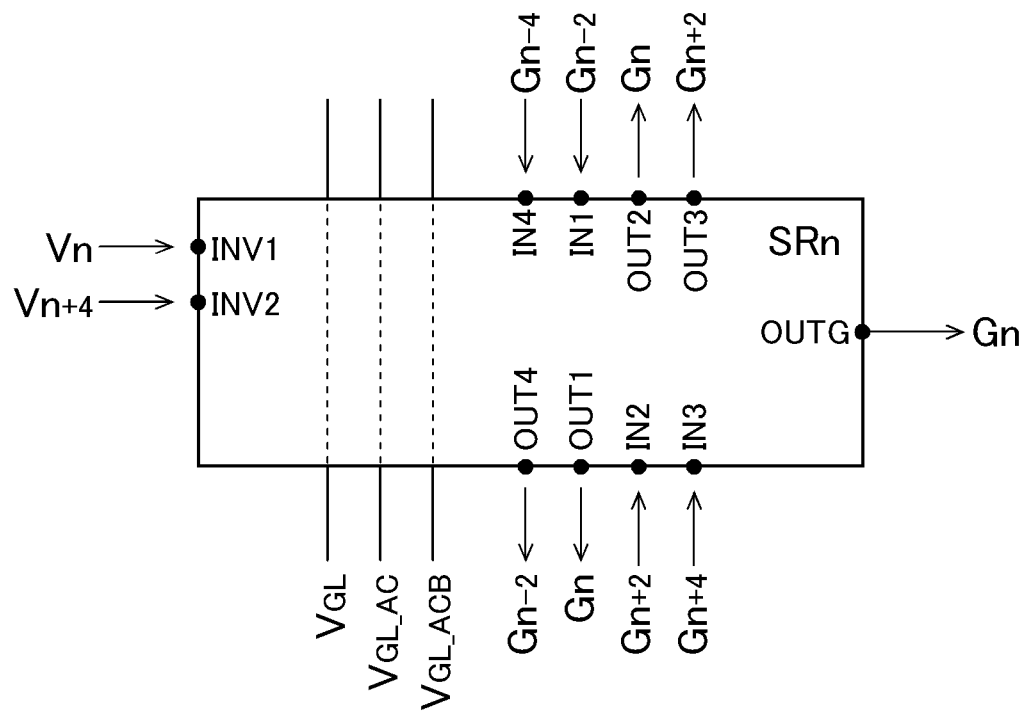
FIG. 4 is a diagram illustrating input and output of an n-th shift register circuit according to the embodiment of the present invention.

FIG. 4 is a diagram illustrating input and output of the n-th shift register circuit $SR_n$ according to this embodiment. As illustrated in FIG. 4, the n-th shift register circuit $SR_n$ is provided with four input terminals IN1 to IN4, and four output terminals OUT1 to OUT4 in addition to a gate output terminal OUTG. The gate signal $G_n$ is output from the gate output terminal OUTG. Gate signals $G_{n-2}$, $G_{n+2}$, $G_{n+4}$, and $G_{n-4}$ are input from the four input terminals IN1 to IN4. The gate signals Gn, Gn, $G_{n+2}$, $G_{n-2}$ are output from the four output terminals OUT1 to OUT4. Further, the n-th shift register circuit $SR_n$ is provided with two input terminals INV1 and INV2, and clock signals $V_n$ and $V_{n+4}$ are input to those input terminals INV1 and INV2, respectively.

Figure 5:
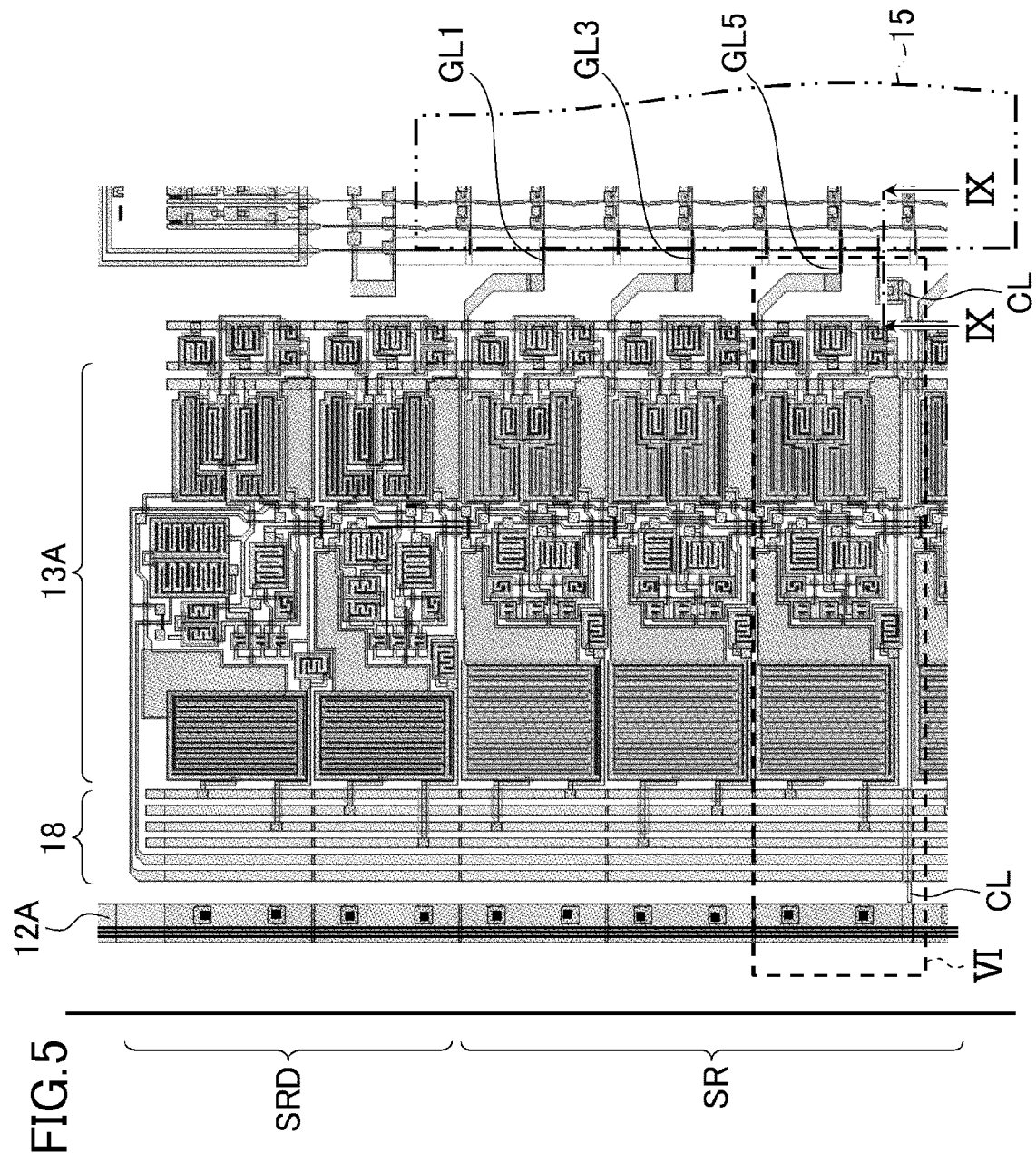
FIG. 5 is a top view illustrating a peripheral circuit of a display unit according to the embodiment of the present invention.

FIG. 5 is a top view illustrating a peripheral circuit of the display unit 15 according to this embodiment. In FIG. 5, the two dummy shift register circuits SRDa, SRDb and three shift register circuits SR1, SR3, SR5 are illustrated in the gate driver circuit 13A. Further, a gate circuit input block 18 is disposed on the left side thereof, and the common bus line 12A is disposed between a panel terminal and the gate circuit input block 18. The gate circuit input block 18 is a signal line group that receives the above-mentioned four-phase clock signals and two auxiliary signals.

Figure 6:
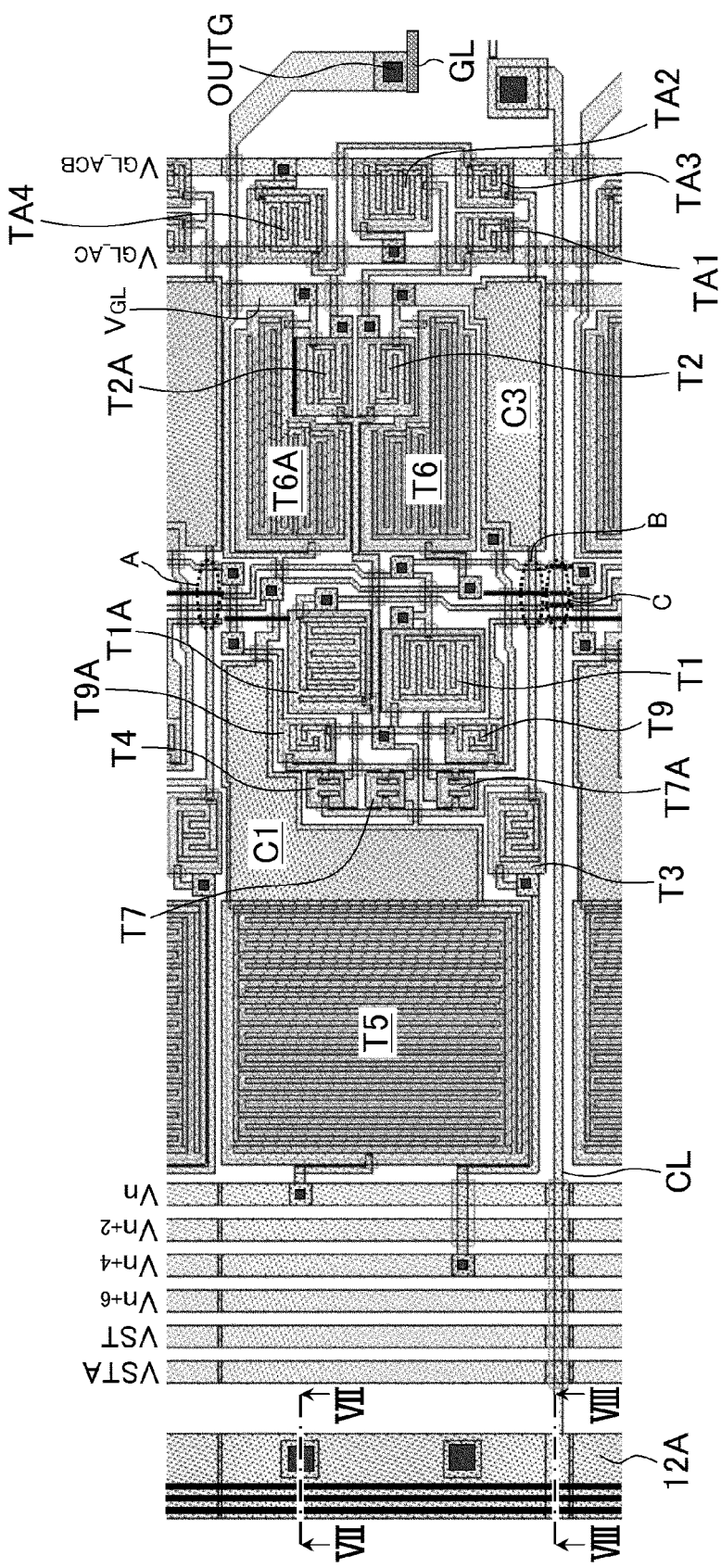
FIG. 6 is a top view illustrating a shift register circuit according to the embodiment of the present invention.

FIG. 6 is a top view illustrating the shift register circuit SR according to this embodiment, which enlarges a dashed area VI illustrated in FIG. 5. As illustrated in FIG. 6, one shift register circuit SR includes a plurality of transistors and a plurality of capacitors. The detail will be described later. The shift register circuit SR illustrated in FIG. 6 will be generally described as the n-th shift register circuit $SR_n$. The n-th shift register circuit $SR_n$ has the four input terminals IN1 to IN4, and the four output terminals OUT1 to OUT4 (refer to FIG. 4). The four internal wirings shown in a dashed area A on an upper side of FIG. 6 are connected to two input terminals IN1, IN4, and two output terminals OUT2, OUT3. Likewise, the four internal wirings shown in a dashed area B on a lower side of FIG. 6 are connected to two input terminals IN2, IN3, and two output terminals OUT1, OUT4. The common voltage line CL is arranged on a lower side in the figure, of the shift register circuit SR illustrated in FIG. 6, and the common voltage line CL sterically intersects with the four internal wirings in a dashed area C.

When each of the common voltage lines CL is arranged in the spacing between the adjacent shift register circuits SR, the gate signal line GL extending from the gate output terminal OUTG of the shift register circuits SR, and the common voltage line CL are prevented from sterically intersecting with each other, but sterically intersect with the internal wiring arranged in the spacing between the adjacent shift register circuits SR. However, the above internal wiring is connected indirectly to the corresponding gate signal line GL through the internal wiring within the shift register circuit SR. A possibility that the electrostatic discharge failure is generated in the intersecting portion between the internal wiring and the common voltage line CL is suppressed as compared with a case in which the gate signal line GL and the common voltage line CL sterically intersect with each other. Further, when the number of common voltage lines CL is made smaller than the number of gate signal lines GL, the intersecting portions of the internal wirings and the common voltage lines CL can be reduced, thereby making it possible to further improve the yield.

Figure 7:
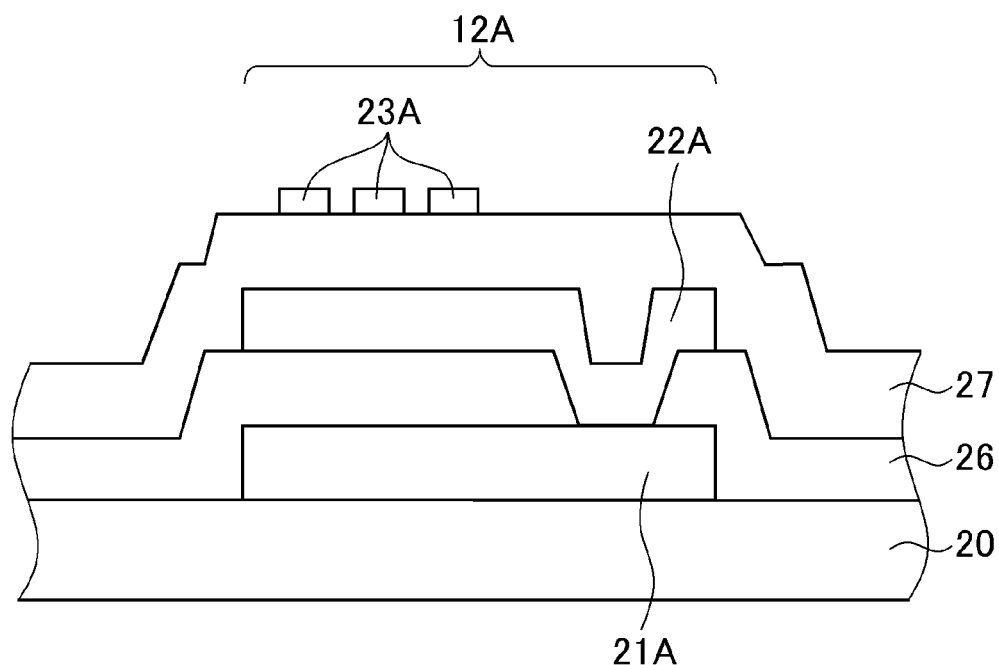
FIG. 7 is a schematic cross-sectional view illustrating a common bus line according to the embodiment of the present invention.
Figure 8:
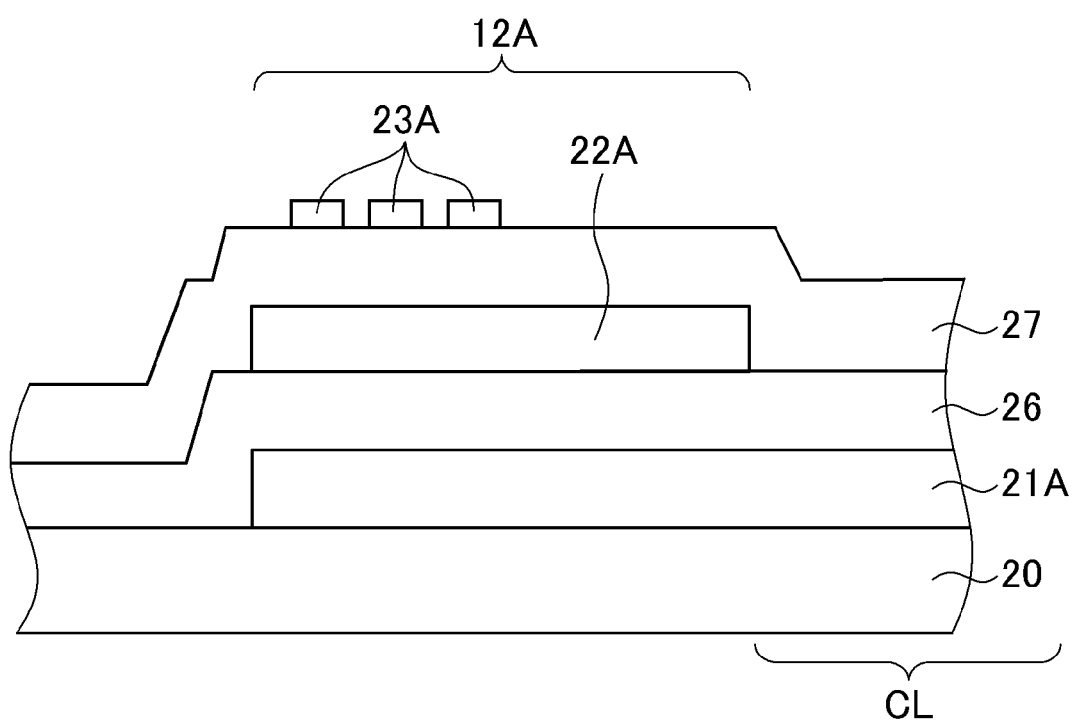
FIG. 8 is a schematic cross-sectional view illustrating the common bus line according to the embodiment of the present invention.
Figure 9:
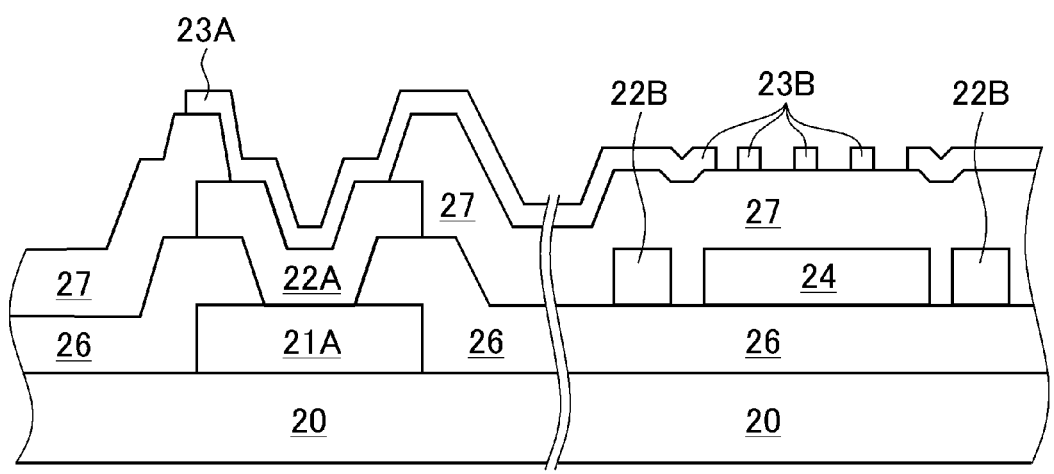
FIG. 9 is a schematic cross-sectional view illustrating a common electrode according to the embodiment of the present invention.

FIGS. 7 and 8 are schematic cross-sectional views of the common bus line 12A according to this embodiment. FIGS. 7 and 8 illustrate cross-sections taken along a line VII-VII and a line VIII-VIII illustrated in FIG. 6. Also, FIG. 9 is a schematic cross-sectional view of the common electrode 14 according to this embodiment. As a cross-section taken along a line IX-IX illustrated in FIG. 5, a cross-section of each junction portion of the common voltage lines CL and the common electrode 14 is illustrated on a left side of FIG. 9, and a cross-section of the common electrode 14 of the display unit 15 is illustrated on a right side of FIG. 9.

First, the common bus lines 12 will be described. As illustrated in FIGS. 7 and 8, the common bus line 12A according to this embodiment includes a superposition structure in which a plurality of conductive layers are stacked on each other through insulating layers. As illustrated in FIGS. 7 and 8, the plurality of conductive layers includes a first conductive layer 21A, a second conductive layer 22A, and a third conductive layer 23A, and a first insulating layer 26 and a second insulating layer 27 are stacked between the respective three conductive layers in the stated order. Portions forming the first conductive layer 21A and the second conductive layer 22A of the common bus line 12A extend with an equal width in a vertical direction of FIG. 6. Through-holes are periodically formed in the common bus line 12A along the vertical direction of FIG. 6, and the first conductive layer 21A and the second conductive layer 22A are electrically connected with each other.

FIG. 7 illustrates a cross-section of the common bus line 12A in which the through-holes are formed. When the common bus line 12A includes two layers of the first conductive layer 21A and the second conductive layer 22A, a sheet resistance of the common bus lines 12 as a wiring can be reduced, and the wiring width as each common bus line can be reduced as compared with a case which does not have the superposition structure. Also, the first conductive layer 21A is made of the same material as that of a gate electrode of the TFT in each pixel circuit provided in the display unit 15, and in a process of manufacturing the TFT substrate 2, the first conductive layer of the common bus line can be formed in a process of forming the gate line or the gate electrode of the TFT. Furthermore, the second conductive layer 22A is made of the same material as that of the plurality of video signal lines or a drain electrode of the TFT in each pixel circuit. Likewise, in a process of manufacturing the TFT substrate 2, the second conductive layer of the common bus line can be formed in a process of forming the video signal lines or the drain electrode of the TFT. As a result, the common bus lines in which the wiring resistance is suppressed while an increase in the number of processes is suppressed can be formed.

In the common bus line 12A according to this embodiment, three reed-shaped third conductive layers 23A extend in the vertical direction of FIG. 6. The third conductive layer 23A is formed of an indium tin oxide (hereinafter referred to as "ITO") thin film. The third conductive layer 23A and the common electrode 14 are each formed of, for example, an ITO thin film, and in the process of manufacturing the TFT substrate 2, the third conductive layer of the common bus line can be formed in the process of forming the common electrode 14. The third conductive layer 23A is formed on an uppermost layer of the common bus line 12A extending to the vicinity of a panel edge of the TFT substrate 2, to thereby obtain the following advantages.

In general, since the ITO thin film is low in wettability with a liquid alignment film (high in contact), to arrange the ITO thin film in an area where spread of the liquid alignment film is to be suppressed is effective to improve a patterning precision of the alignment film. In particular, if the wettability of the insulating film and the alignment film stacked on the surface of the circuit formed on the substrate is high, and the wettability of the ITO thin film and the alignment film is low, the spread of the alignment film can be stopped by an edge where the ITO thin film is formed.

For example, in the liquid crystal display device, the alignment film is formed on the surface of the TFT substrate, and the TFT substrate and the filter substrate are stuck to each other with a seal material to seal a liquid crystal layer. When the alignment film is formed in an area where the TFT substrate is coated with the seal material, there arises such a problem that moisture can enter an interior of a cell where the liquid crystal layer is sealed. This is because if adhesiveness of the alignment film and the TFT substrate is generally lower than the adhesiveness of the TFT substrate and the seal material, and the alignment film is formed under the seal material, the moisture enters the interior of the cell through an interface between the alignment film and the TFT substrate. When the moisture enters the interior of the cell, the entered moisture and the conductive film have a redox reaction by a potential difference (electric field) developed between the wirings while the liquid crystal display device is driven, and trouble may occur such that the wiring may be melted, or air bubbles may occur. On the contrary, in the liquid crystal display device according to this embodiment, the spread of the alignment film on the surface of the TFT substrate 2 can be stopped by the third conductive layer 23A of the common bus line 12A. That is, the third conductive layer 23A functions as an alignment film dammed pattern. With this configuration, the deterioration of reliability of the device is suppressed. In order to suppress the occurrence of the electric field between the third conductive layer 23A and the conductive layer stacked downward, it is desirable that a potential of the third conductive layer 23A is set to the common reference voltage. That is, it is desirable that the third conductive layer 23A is electrically connected to the first conductive layer 21A and the second conductive layer 22A.

Subsequently, the common voltage lines CL will be described. FIG. 8 illustrates a cross-section of the common bus line 12A of the junction portion with each common voltage line CL. As described above, the common bus line 12A is of the superposition structure of the three conductive layers. The first conductive layer 21A of those three conductive layers extends toward the right side of FIG. 8, and configures each common voltage line CL. As illustrated in FIG. 6, the common voltage line CL extends with a given width in the lateral direction in the figure, and reaches the junction portion with the common electrode 14 arranged on the right side in FIG. 6. Also, the common voltage lines CL sterically intersect with six wirings of the gate circuit input block 18 and the above-mentioned four internal wirings.

Further, the common electrode 14 will be described. A left side of FIG. 9 illustrates the junction portion of the common voltage line CL and the common electrode 14, and a right side of FIG. 9 illustrates a cross-section of the common electrode 14 in the display unit 15. As illustrated in the left side of FIG. 9, an area (first through-hole) in which the first insulating layer 26 is not formed is formed on an upper side of the first conductive layer 21A, and an area (second through-hole) in which the second insulating layer 27 is not formed is formed on an upper side of the first conductive layer 21A. The first conductive layer 21A, the second conductive layer 22A, and the third conductive layer 23A are electrically connected to each other through each of the through-holes. As illustrated in the right side of FIG. 9, the common electrode 14 is formed by a third conductive layer 23B, and the third conductive layers 23A and 23B are connected to each other. As a result, the common voltage line CL formed by the first conductive layer 21A and the common electrode 14 formed by the third conductive layer 23B are electrically connected to each other.

The right side of FIG. 9 further illustrates a cross-section of two video signal lines extending to the display unit 15, and the pixel electrode. The two video signal lines are formed by a second conductive layer 22B, and formed in the same process as that of the second conductive layer 22A of the common bus line 12A as described above. Also, the pixel electrode is formed by a fourth conductive layer 24. The TFT having each pixel formed in the liquid crystal display device according to this embodiment is of a common top structure in which the common electrode is formed above the pixel electrode connected to a source electrode of the TFT. In this case, a plurality of slits are formed in the common electrode 14. However, the TFT does not need to be limited to this structure, but may be of a source top structure in which the pixel electrode connected to the source electrode of the TFT is formed above the common electrode.

The common bus line 12A, the common voltage lines CL, and the common electrode 14 according to this embodiment have been described above. Subsequently, a description will be given in brief of the shift register circuits SR according to this embodiment.

Figure 10:
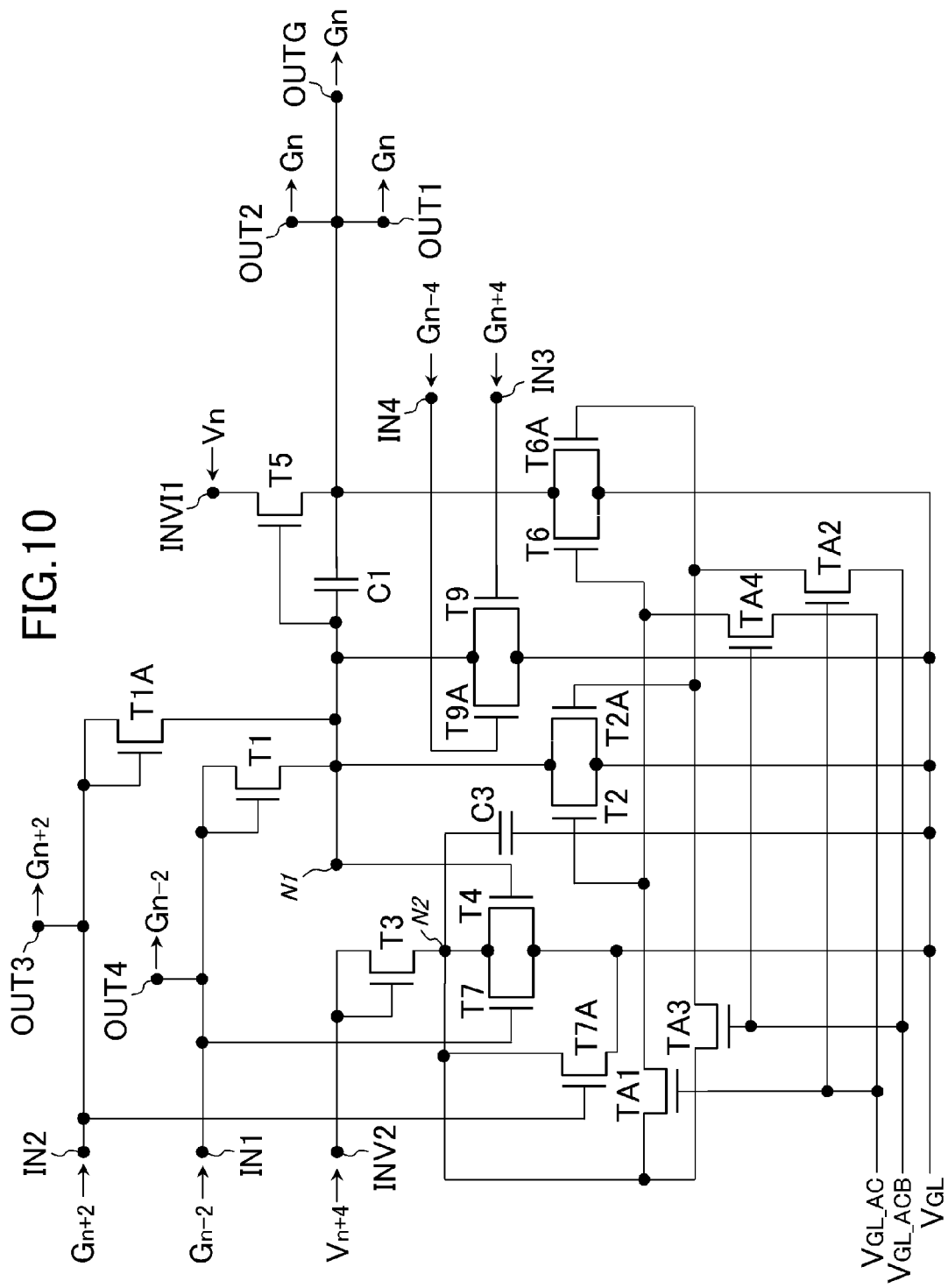
FIG. 10 is a diagram illustrating the n-th shift register circuit according to the embodiment of the present invention.

FIG. 10 is a circuit diagram illustrating the n-th shift register circuit $SR_n$ according to this embodiment. The shift register circuits SR are configured by a plurality of transistors and a plurality of capacitors. The reference numerals or symbols of the respective elements correspond to reference numerals or symbols of the respective portions of the shift register circuits SR illustrated in FIG. 6. A node N1 is a voltage applied to a gate of a transistor T5, becomes high voltage in correspondence with a period (signal high period) during which a gate signal is high voltage, and becomes low voltage in the other periods. When the node N1 is high voltage, the transistor T5 becomes on, and a voltage of a clock signal $V_n$ input from the input terminal IN1 is applied to the gate output terminal OUTG. A node N2 becomes low voltage in correspondence with the signal high period, and becomes high voltage in the other periods. When the node N2 is high voltage, a transistor T6 or a transistor T6A becomes on, and a low voltage of the low voltage line $V_{GL}$ is applied to the gate output terminal OUTG. Likewise, a transistor T2 or a transistor T2A becomes on, the low voltage of the low voltage line $V_{GL}$ is applied to the node N1. The other transistors are configured to control the node N1 or the node N2.

Figure 11:
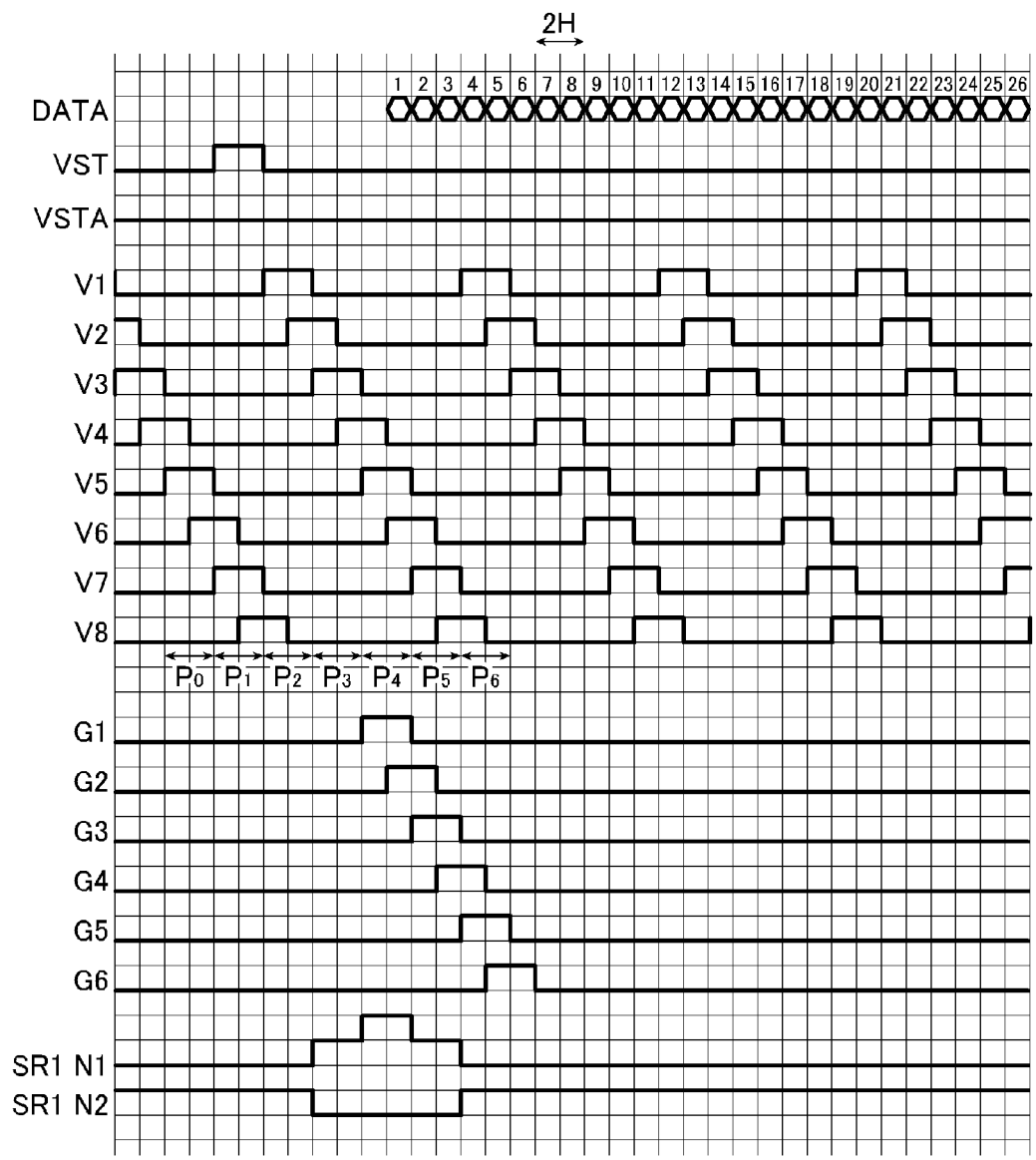
FIG. 11 is a diagram illustrating a driving method of the gate driver circuit according to the embodiment of the present invention.
Figure 12:
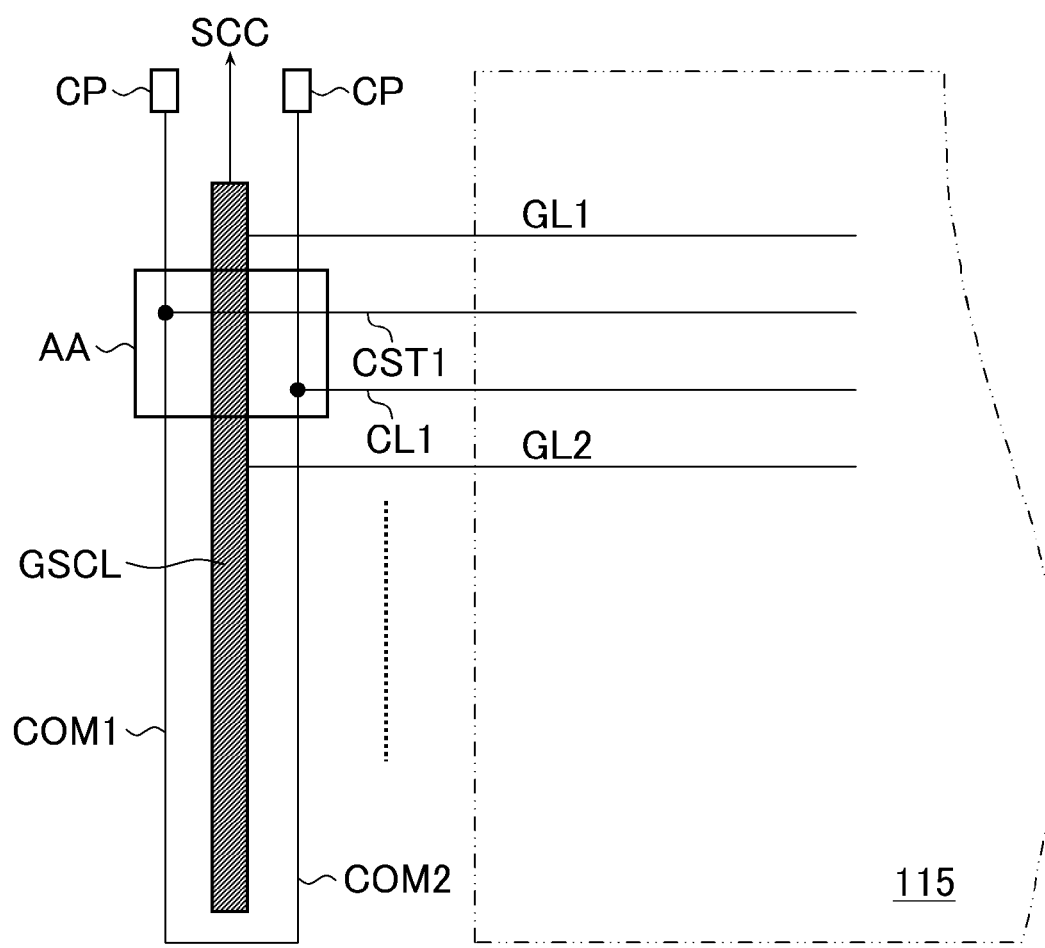
FIG. 12 is a schematic plan view illustrating a gate driver circuit and a peripheral configuration in a related art.
Figure 13:
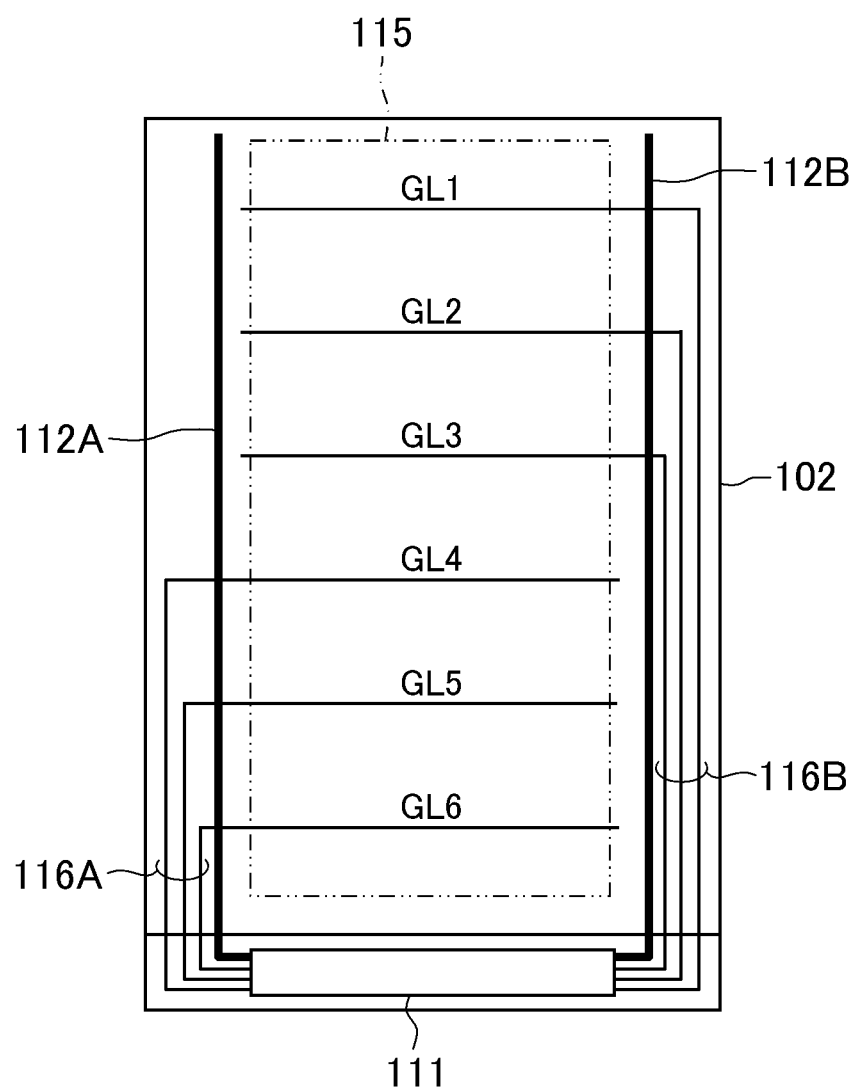
FIG. 13 is a schematic plan view illustrating one reference example of a layout of common bus lines and gate bus lines arranged on a substrate.
Figure 14:
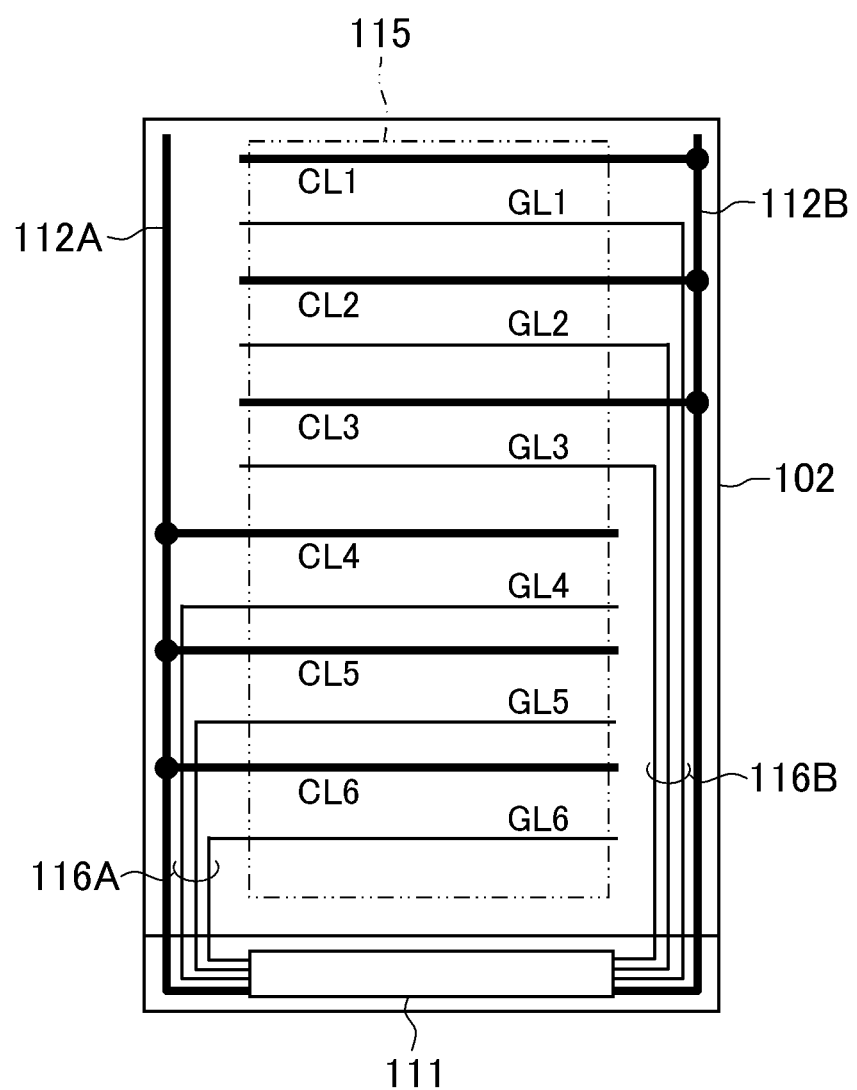
FIG. 14 is a schematic plan view illustrating another reference example of the layout of the common bus lines and the gate bus lines arranged on the substrate.

FIG. 11 is a diagram illustrating a driving method of the gate driver circuits 13 according to this embodiment. FIG. 11 illustrates a case in which the gate driver circuits 13 are driven forward. The axis of abscissa in the figure represents a time, and temporal changes of the respective voltages of a voltage DATA of the video signal line, two auxiliary signals, eight clock signals, six gate signals, and the nodes N1 and N2 of the first shift register circuit SR1 are illustrated in FIG. 11. Although not shown in FIG. 11, the voltage of the low voltage line $V_{GL}$ is always low voltage, and when one of the first variable voltage line $V_{GL\_AC}$ and the second variable voltage line $V_{GL\_ACB}$ is high voltage, the other variable voltage line is low voltage. The high voltage and the low voltage are periodically repeated with an m frame period (m is an integer of 1 or higher) as a period.

Eight clock signals $V_1$ to $V_8$ will be described (refer to FIG. 11). The clock signals have 8 horizontal periods (8H) as one cycle, and two horizontal periods (2H) are a signal high period. The eight clock signals $V_1$ to $V_8$ become the signal high period sequentially every one horizontal period (1H) is elapsed. That is, the signal high periods of the adjacent clock signals overlap with each other by one horizontal period (1H). One set of the clock signals $V_1$, $V_3$, $V_5$, and $V_7$ is input to the gate driver circuit 13A arranged on the left side of FIG. 2, and the other set of the clock signals $V_2$, $V_4$, $V_6$, and $V_8$ is input to the gate driver circuit 13B arranged on the right side of FIG. 2. When the clock signal is generally represented by $V_k$, the clock signal $V_k$ satisfying k={(n+3)mod 8+1} is input to the input terminal INV1 of the n-th shift register circuit SRn and represented as the clock signal $V_n$. Likewise, a clock signal $V_{k+4}$ is input to the input terminal INV2, and represented as a clock signal $V_{n+4}$. When k+4 takes a value other than 1 to 7, k+4 may be translated by $V_{k+4}=V_{k-4}$.

Hereinafter, driving of the gate driver circuit 13A will be described with reference to FIGS. 10 and 11. In a period P0, in all of the shift register circuits SR and the dummy shift register circuits SRD, the node N1 is low voltage, and the node N2 is high voltage. In a period P1, when the auxiliary signal VST becomes high voltage, a dummy gate signal of the dummy shift register circuit SRDa becomes high voltage in a period P2, and a dummy gate signal of the dummy shift register circuit SRDb becomes high voltage in a period P3.

Hereinafter, the driving will be described with reference to the first shift register circuit SR1 (n=1). In the period P3, when the gate signal $G_{n-2}$ (dummy gate signal of the dummy shift register circuit SRDb) which is input to the input terminal IN1 becomes high voltage, the transistor T1 turns on, the node N1 becomes high voltage, and the transistor T5 turns on. Likewise, a transistor T7 turns on, and the node N2 becomes low voltage. With the on-state of the transistor T5, the high voltage of a clock signal $V_n$ ($V_5$) to be input to the input terminal INV1 is applied to the gate output terminal OUTG, and a gate signal $G_n$ ($G_1$) becomes high voltage. Likewise, gate signals $G_2$, $G_3$ ... become the high voltage in periods P5, P6 ..., respectively.

In the period P6, the gate signal $G_{n+4}$ ($G_5$) to be input to the input terminal IN3 becomes high voltage, a transistor T9 turns on, and the node N1 becomes low voltage. Also, the node N2 becomes high voltage by the clock signal $V_{n+4}$ ($V_1$) to be input to the input terminal INV2.

In the case of the backward driving, in the period P1, not the auxiliary signal VST but the auxiliary signal VSTA becomes high voltage. Then, the node N1 becomes high voltage by the gate signal $G_{n+2}$ to be input to the input terminal IN2, and the node N1 becomes low voltage by the gate signal $G_{n-4}$ to be input to the input terminal IN4.

When the first variable voltage line $V_{GL\_AC}$ is high voltage, the gates of the transistors T2 and T6 are connected to the node N2, and the transistors T2 and T6 drive the gate driver circuits. On the other hand, when the second variable voltage line $V_{GL\_AC}$ is high voltage, the gates of the transistors T2A and T6A are connected to the node N2, and the transistors T2A and T6A drive the gate driver circuits. The operation of the transistors which are subject to a DC load for a long time is shared by the two transistors with the result that the temporal deterioration can be suppressed.

The shift register circuits SR illustrated in FIG. 10 merely illustrates an example of the embodiment, and a shift register circuit of the other structures may be applied. In particular, when bidirectional driving is not necessary, the gate signal $G_{n-4}$ is unnecessary to input, the number of internal wirings arranged in the spacings of the adjacent shift register circuits becomes three, and the advantages of the present invention are further enhanced. Also, since the present invention is applicable without depending on the structure of the TFT provided in each pixel circuit of the display unit 15, the semiconductor provided in the TFT may be amorphous Si, microcrystalline Si, low-temperature polysilicon, or oxide semiconductor, and can be applied to an TFT having semiconductor to be put into practical use.

As the display device according to the embodiment of the present invention, the IPS liquid crystal display device has been described. However, the display device according to the present invention may be other liquid crystal display devices such as a VA (vertically aligned) liquid crystal display device or a TN (twisted nematic) liquid crystal display device, or the other display devices such as an organic EL display device. The present invention can be widely applied to the display device having the common electrode.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A display device having a substrate, the substrate comprising:
   a display unit in which a plurality of pixel circuits, and a common electrode for applying a common reference voltage to the plurality of pixel circuits are formed;
   N (integer satisfying N≥3) gate signal lines that extend in the display unit;
   a gate driver circuit in which N shift register circuits that are connected to the respective gate signal lines to supply a gate signal are arranged side by side outside of the display unit;

a common voltage main line that is arranged further outside of the gate driver circuit with respect to the display unit so that the gate driver circuit is located between the common voltage main line and the display unit; and M common voltage sub-lines that extend in M (1≤M<N−1) spacings among (N−1) spacings between the respective N shift register circuits which are arranged side by side, from the common voltage main line to the common electrode.

2. The display device according to claim 1,
wherein the common voltage main line includes a superposition structure in which a plurality of conductive layers are stacked on each other through insulating layers.

3. The display device according to claim 2,
wherein the substrate further comprises a plurality of video signal lines that extend to the display unit,
wherein the plurality of conductive layers include the conductive layers made layer comprised of the same material as that of the plurality of video signal lines.

4. The display device according to claim 2,
wherein each of the pixel circuits includes a thin film transistor, and
wherein the plurality of conductive layers include the conductive layers comprised of the same material as that of a gate electrode of the thin film transistor.

5. The display device according to claims 2,
wherein an uppermost layer of the plurality of conductive layers is a conductive layer comprised of the same material as that of the common electrode.

6. The display device according to claim 5,
wherein the material of the common electrode comprises indium tin oxide.

7. A display device having a substrate, the substrate comprising:
a display unit in which a plurality of pixel circuits, and a common electrode for applying a common reference voltage to the plurality of pixel circuits are formed;
N (integer satisfying N≥3) gate signal lines that extend in the display unit;
a pair of gate driver circuits arranged on opposite sides of the display unit, each including N shift register circuits that are connected to the respective gate signal lines to supply a gate signal, said shift register circuits being arranged side by side;
a pair of common voltage main lines that are arranged on opposite sides of the display unit from one another and arranged further outside of the gate driver circuits with respect to the display unit so that the display unit and the gate driver circuits are located between the pair of common voltage main lines; and
M common voltage sub-lines that extend in M (1≤M<N−1) spacings among (N−1) spacings between the respective N shift register circuits which are arranged side by side, from the common voltage main lines to the common electrode.

8. The display device according to claim 7,
wherein the common voltage main lines each include a superposition structure in which a plurality of conductive layers are stacked on each other through insulating layers.

9. The display device according to claim 8,
wherein the substrate further comprises a plurality of video signal lines that extend to the display unit,
wherein the plurality of conductive layers include the conductive layers comprised of the same material as that of the plurality of video signal lines.

10. The display device according to claim 8,
wherein each of the pixel circuits includes a thin film transistor, and
wherein the plurality of conductive layers include the conductive layers comprised of the same material as that of a gate electrode of the thin film transistor.

11. The display device according to claim 8,
wherein an uppermost layer of the plurality of conductive layers is a conductive layer comprised of the same material as that of the common electrode.

12. The display device according to claim 11,
wherein the material of the common electrode comprises indium tin oxide.

* * * * *